US012418880B1

(12) United States Patent
Xu et al.

(10) Patent No.: US 12,418,880 B1
(45) Date of Patent: Sep. 16, 2025

(54) GNSS AND RSSI INTEGRATED POSITIONING METHOD CONSIDERING MAC ADDRESS

(71) Applicant: SHANDONG UNIVERSITY OF SCIENCE AND TECHNOLOGY, Qingdao (CN)

(72) Inventors: Ying Xu, Qingdao (CN); Hongzhan Zhou, Qingdao (CN); Zhikun Li, Qingdao (CN); Guangxu Zhang, Qingdao (CN); Jinjie Sun, Qingdao (CN); Tengfei Zhang, Qingdao (CN); Zhihao Zheng, Qingdao (CN)

( * ) Notice: Subject to any disclaimer, the term of this patent is extended or adjusted under 35 U.S.C. 154(b) by 0 days.

(21) Appl. No.: 19/009,316

(22) Filed: Jan. 3, 2025

(30) Foreign Application Priority Data

Mar. 14, 2024 (CN) .......................... 202410288068.8

(51) Int. Cl.
  *H04W 64/00* (2009.01)
  *H04W 8/26* (2009.01)
(52) U.S. Cl.
  CPC ............ *H04W 64/00* (2013.01); *H04W 8/26* (2013.01)
(58) Field of Classification Search
  CPC .................................................. H04W 64/00
  USPC ... 455/456.1, 456.2, 456.6, 434, 522, 456.3, 455/457
  See application file for complete search history.

(56) References Cited

U.S. PATENT DOCUMENTS 8,743,727 B2 * 6/2014 Selvam ...................... G01S 5/14
  370/252
11,143,738 B1 * 10/2021 Kalavakuru ............ H04W 4/80
11,828,832 B2 * 11/2023 Henry ..................... G01S 5/145
2013/0267242 A1 * 10/2013 Curticapean .......... G01S 5/0242
  455/456.1
2014/0248899 A1 * 9/2014 Emadzadeh .......... H04W 4/029
  455/456.1

(Continued)

FOREIGN PATENT DOCUMENTS

CN       102573053  A       7/2012
CN       103885955  A       6/2014

(Continued)

OTHER PUBLICATIONS

Shuaihao Zhao et al., "An indoor positioning technology based on low-power Bluetooth", Beijing Surveying and Mapping, vol. 34, No. 2, Feb. 29, 2020, pp. 238-242.

(Continued)

*Primary Examiner* — Joseph Arevalo
(74) *Attorney, Agent, or Firm* — Daniel M. Cohn

(57) ABSTRACT

The present disclosure relates to the technical field of dense urban area positioning, and specifically discloses a GNSS and RSSI integrated positioning method considering MAC addresses. The method includes the following steps: arranging transmitting nodes and classifying MAC addresses of the transmitting nodes, collecting RSSI raw data; receiving RSSI data and MAC address data by the receiving nodes, and selecting one of the trilateration, two-point positioning, and proximity positioning for positioning based on the MAC address category; collecting GNSS data by the receiving nodes, and uses a differential positioning model to obtain GNSS positioning results; performing weighted fusion of GNSS and RSSI positioning results to ensure positioning accuracy in dense urban areas.

5 Claims, 6 Drawing Sheets

(56) References Cited

U.S. PATENT DOCUMENTS

| | | | |
|---|---|---|---|
| 2014/0256347 A1* | 9/2014 | Lakhzouri | G01S 5/0244 |
| | | | 455/456.1 |
| 2014/0274116 A1* | 9/2014 | Xu | G01S 11/06 |
| | | | 455/456.1 |
| 2015/0005016 A1* | 1/2015 | Palanki | H04W 4/027 |
| | | | 455/456.6 |
| 2016/0021511 A1* | 1/2016 | Jin | H04W 4/02 |
| | | | 455/457 |
| 2018/0352055 A1* | 12/2018 | He | H04L 1/0084 |
| 2020/0379696 A1* | 12/2020 | Konji | G06F 3/1204 |
| 2022/0007267 A1* | 1/2022 | Maattanen | H04W 8/26 |
| 2022/0066010 A1* | 3/2022 | Henry | G01S 5/0236 |
| 2022/0070612 A1* | 3/2022 | Henry | H04B 1/7163 |
| 2022/0263700 A1 | 8/2022 | Dabbs et al. | |
| 2022/0322038 A1 | 10/2022 | Baek | |
| 2023/0164736 A1* | 5/2023 | Kim | H04L 5/0053 |
| | | | 455/456.1 |
| 2023/0292186 A1* | 9/2023 | Simoniy | H04W 36/0016 |
| 2023/0328656 A1* | 10/2023 | Rudolf | H04W 52/24 |
| 2024/0045046 A1* | 2/2024 | Henry | G01S 5/0236 |
| 2025/0227787 A1* | 7/2025 | Kim | H04B 17/318 |

FOREIGN PATENT DOCUMENTS

| | | |
|---|---|---|
| CN | 107830862 A | 3/2018 |
| CN | 109525935 A | 3/2019 |
| CN | 109951798 A | 6/2019 |
| CN | 110118549 A | 8/2019 |
| CN | 114363808 A | 4/2022 |
| CN | 114449438 A | 5/2022 |
| CN | 117320148 A | 12/2023 |
| KR | 101850332 B1 | 4/2018 |
| WO | 2023005814 A1 | 2/2023 |

OTHER PUBLICATIONS

Weiguo Guan et al., "Indoor and outdoor fusion localization method based on BeiDou pseudo-range difference and WiFi", Transducer and Microsystem Technologies, vol. 38, No. 5, May 31, 2019, pp. 13-16.

Jianwei Niu et al., "Indoor localization system based on multi-information fusion", Chinese Journal on Internet of Things, vol. 1, No. 1, Jun. 30, 2017, pp. 55-66.

Tingting Huang et al., "Research on indoor positioning model based on multi-source data fusion", Modern Electronics Technique, vol. 43, No. 14, Jul. 31, 2020, pp. 21-29.

Hui Tian et al., "A novel method for metropolitan-scale Wi-Fi localization based on public telephone booths", IEEE/ION Position,Location and Navigation Symposium, Jul. 8, 2010, pp. 357-364.

Yu Chen et al., "PDR/iBeacon integration indor positioning algorithm based on mobile intelligent terminal", Beijing Surveying and Mapping, vol. 37, No. 2, Feb. 28, 2023, pp. 280-288.

Iemei Zhang, "Study of feature selection algorithms in Indoor Positioning System", SOFTWARE, vol. 36, No. 1, Jan. 31, 2015, pp. 38-46.

* cited by examiner

GNSS AND RSSI INTEGRATED POSITIONING METHOD CONSIDERING MAC ADDRESS

TECHNICAL FIELD

The present disclosure relates to the technical field of dense urban area positioning and GNSS and RSSI integrated positioning, in particular to a GNSS and RSSI integrated positioning method considering MAC address.

BACKGROUND

With the rapid development of the economy and the continuous advancement of urbanization, the scale of road networks and buildings in cities and their surrounding areas continues to increase. The complex transportation network and dense buildings greatly restrict the accuracy, availability, and reliability of urban navigation and positioning services. The explosive increase in the total number of vehicles, the rapidly growing logistics, express delivery, shared bike/car industries, as well as public utilities such as disaster prevention, firefighting, and emergency rescue, have all put forward significant demands and high requirements on navigation and positioning services of low-cost mobile terminal (mobile phones, tablets, etc.). Therefore, it is imperative to achieve high-precision navigation and positioning services of low-cost mobile terminal in dense urban areas.

As is well known, in outdoor open environments, the use of Global Navigation Satellite Systems (GNSS), including the BeiDou Navigation Satellite System (BDS-3), can provide users with high-precision location information. However, due to the towering buildings on both sides of the streets in dense urban areas, so-called urban canyon has formed, severely blocking GNSS satellite signals, resulting in a sharp decrease in the number of satellites that GNSS terminals located on the streets can receive, leading to low or even impossible GNSS positioning accuracy in dense urban areas.

Bluetooth low energy (BLE) Beacon based on Received Signal Strength Indication (RSSI) is easy to install and cost-effective, with the potential to provide positioning solutions in dense urban environments. RSSI based positioning has a small coverage range and a positioning accuracy between 1 m and 5 m, with a better positioning accuracy than that of GNSS in in dense urban areas. However, it requires the deployment of dedicated transmitting nodes BLE Beacon, and high density deployment of nodes is relatively troublesome.

In addition, there are currently three RSSI positioning methods, namely trilateration, two-point positioning, and proximity positioning. However, a single RSSI positioning method often has significant limitations and cannot meet the positioning accuracy requirements of dense urban areas. Therefore, using multi-source information integrated positioning to improve the positioning accuracy of dense urban areas is the development trend of high-precision positioning technology in dense urban areas.

SUMMARY

The objective of the present disclosure is to provide a GNSS and RSSI integrated positioning method considering MAC address. The method is based on GNSS and RSSI integrated positioning, and multiple RSSI positioning are performed while obtaining one GNSS positioning. During the RSSI positioning process, the MAC address of the transmitting node is taken into account, and different RSSI positioning methods are selected based on the different categories of MAC addresses. Finally, the GNSS and RSSI positioning results are weighted and fused to improve the positioning accuracy in dense urban areas.

In order to achieve the above objective, the present disclosure adopts the following technical solution:

A GNSS and RSSI integrated positioning method considering MAC address, including the following steps:

Step 1. arranging the transmitting nodes and classify MAC addresses of the transmitting nodes, and using a receiving node to collect RSSI raw data, wherein the transmitting nodes adopt BLE Beacon, and the receiving node adopts a mobile terminal with BLE function;

Step 2. when the receiving node receives the RSSI from the transmitting node, it will also receive its MAC addresses, selecting one of trilateration, two-point positioning, and proximity positioning for RSSI positioning based on the MAC address category;

Step 3. collecting GNSS data by the receiving node, and using a differential positioning model to obtain GNSS positioning results;

Step 4. after independent positioning of GNSS and RSSI, performing weighted fusion on the positioning results of GNSS and RSSI.

Advantages of the present disclosure are shown as following:

As described above, the present disclosure relates to a GNSS and RSSI integrated positioning method considering MAC address. This method is based on GNSS and RSSI integrated positioning. Firstly, the Mac addresses of the transmitting nodes are classified, and different RSSI positioning methods are selected for different categories of MAC addresses to avoid the situation where using a single RSSI positioning method leads to excessive positioning result errors, thereby improving RSSI positioning accuracy; Secondly, based on obtaining once of GNSS positioning result, multiple RSSI positioning are performed, taking into account the RSSI positioning method that switches based on MAC address, so as to integrate of GNSS and RSSI positioning results, while ensuring positioning accuracy, the calculation is simpler, processing efficiency and real-time performance are higher. The present disclosure achieves the integration of GNSS positioning and RSSI positioning through an information fusion based method, which well meets the user's demand for high-precision positioning in dense urban areas.

DETAILED DESCRIPTION OF THE EMBODIMENTS

In order to make the technical problems, technical solutions and beneficial effects of the present invention clearer, the present invention will be further described in detail below with reference to the accompanying drawings and embodiments.

The present disclosure relates to a GNSS and RSSI integrated positioning method considering MAC address. The method is achieved based on the integrated positioning of GNSS and RSSI, which is conducive to improving the positioning performance of receivers in dense urban areas and achieving accurate positioning in dense urban areas.

Figure 1:
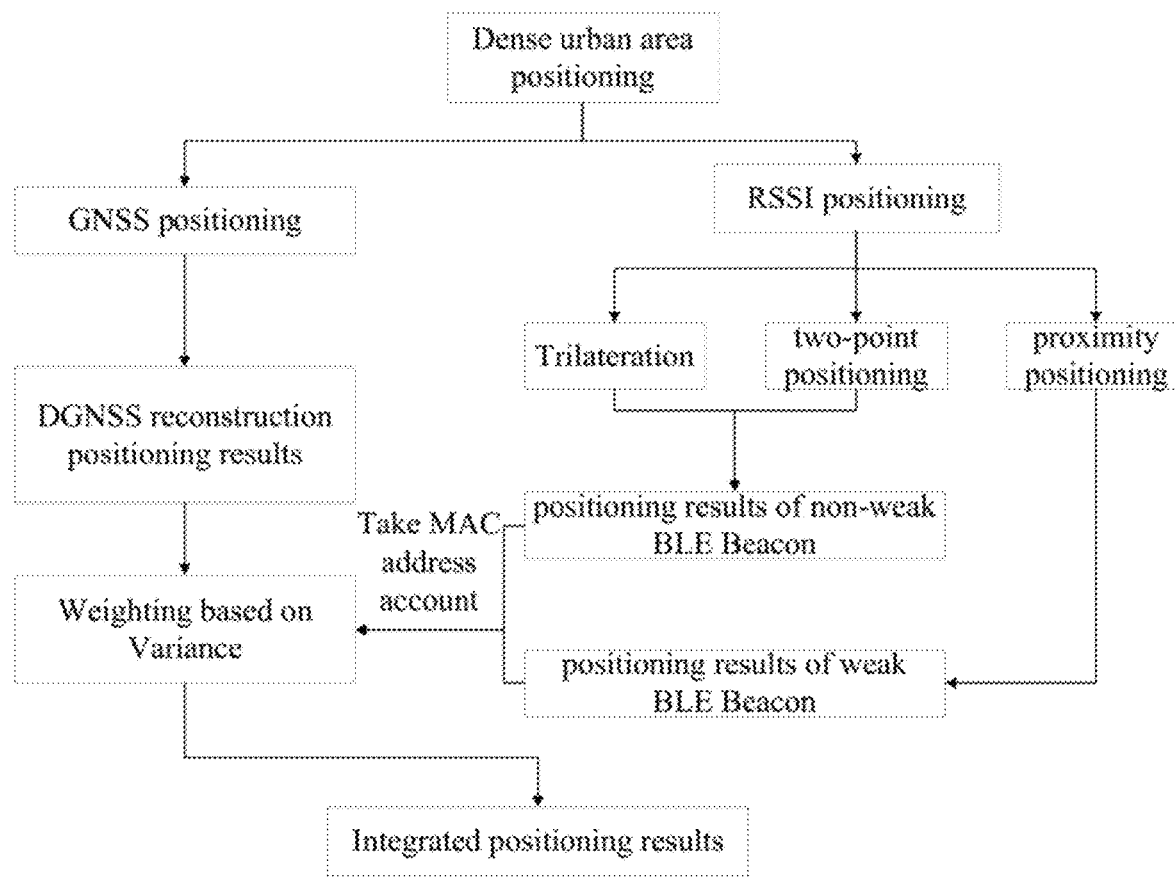
FIG. 1 is a flowchart of a GNSS and RSSI integrated positioning method considering MAC address in an embodiment of the present disclosure.

As shown in FIG. 1, a GNSS and RSSI integrated positioning method considering MAC address includes the following steps:

Step 1, arranging transmitting nodes, classifying MAC addresses of the transmitting nodes, and collecting RSSI raw data along a preset path using a receiving node. In this embodiment, the transmitting nodes can use BLE Beacon with Bluetooth 5.0 technology.

Regarding the receiving node, it can select smart mobile terminals with BLE function, such as smartphones, tablets, etc. that support BLE function.

Figure 2:
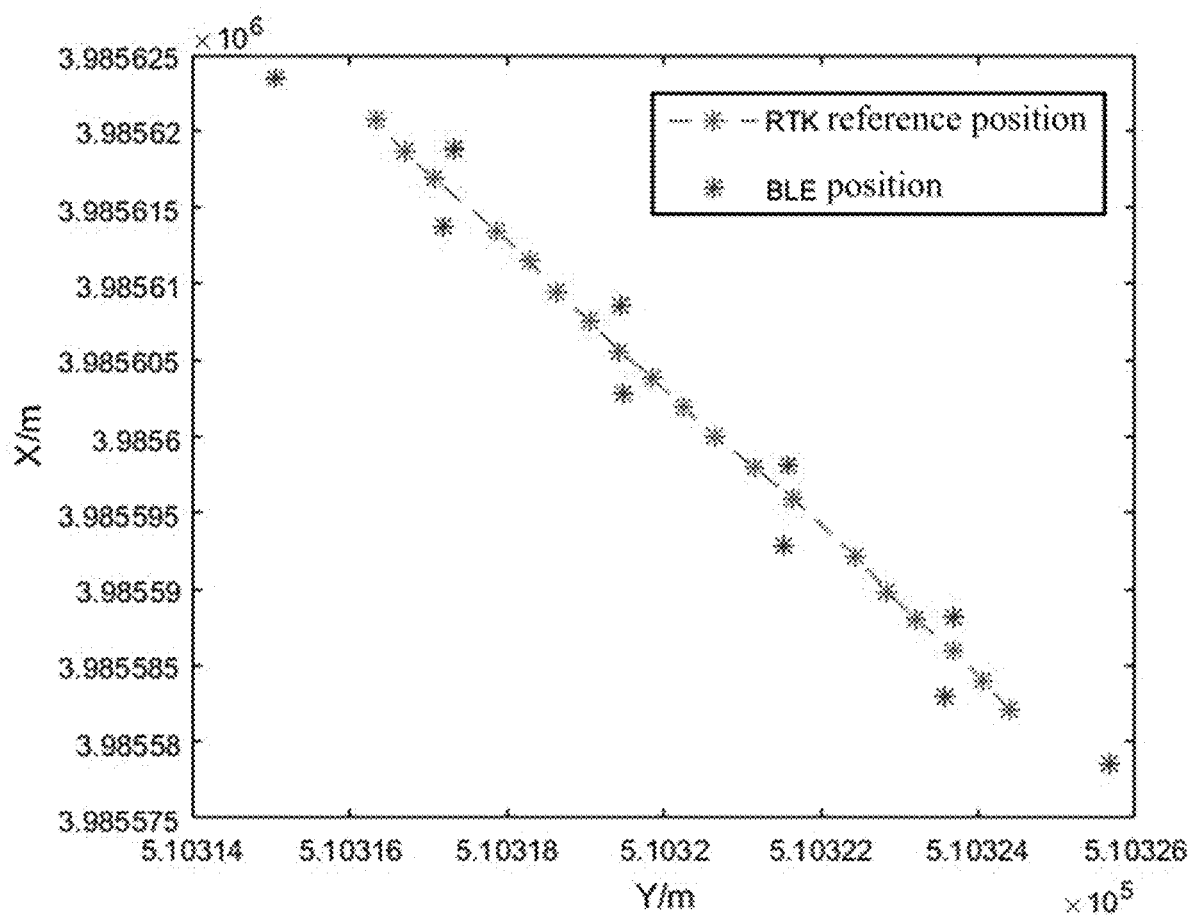
FIG. 2 shows the distribution of transmitting nodes (BLE Beacon) and reference nodes (RTK sampling points)

The transmitting nodes are arranged in a cross setting on both sides of a road, as shown in FIG. 2.

When the density of transmitting nodes is too high, different transmitting nodes will affect each other, resulting in an increase in jump values and fluctuations of RSSI, which affects ranging accuracy. Therefore, the distance between adjacent transmitting nodes is 5-10 meters.

When the receiving node receives the RSSI from the transmitting nodes, it will also receives the MAC addresses of the transmitting nodes at the same time.

The traditional RSSI positioning uses path loss models and trilateration method for positioning, while the present disclosure classifies the MAC addresses of the transmitting nodes and selects the corresponding positioning method for RSSI positioning based on the MAC address category.

There are three RSSI positioning methods in this embodiment, namely trilateration, two-point positioning, and proximity positioning. This RSSI positioning method that switches based on MAC address can avoid the problem of excessive positioning error caused by a single method of RSSI positioning.

Specifically, in the trilateration method, the maximum cosine (Cos) value of the interior angle of a triangle composed of three transmitting nodes (corresponding to the cosine value of the smallest interior angle in the triangle) is generally defined as collinearity, which ranges from 0.5 to 1.0.

In special areas, there may be situations where the collinearity is greater than 0.9, and the trilateration method has poor positioning performance and is not applicable. In dense urban areas, such special areas often appear, such as dense passages between two buildings, narrow sidewalks near tall buildings, and jungle paths covered by tall trees. In these special areas, on the one hand, it is difficult to arrange a sufficient number of transmitting nodes to achieve the trilateration method, and on the other hand, because the path often presents a narrow and elongated shape, the use of trilateration method will involve collinearity issues, resulting in serious deviation of trilateration results from actual results.

Therefore, the present disclosure can use two-point positioning method to locate special areas in dense urban areas. In addition, the RSSI signals emitted by the transmitting nodes exhibit a characteristic of gradually weakening with increasing distance, and the degree of attenuation of RSSI signals emitted by transmitting nodes with different transmission powers also varies. In response to this characteristic, the present disclosure adjusts the transmission power of the transmitting node to a specific level, limiting its RSSI transmission radius within a certain area, and uses proximity positioning method for positioning.

Therefore, according to the transmission power, BLE Beacons can be divided into two categories: non-weak BLE Beacon (transmission power of −8 dBm, transmission radius of about 30 m) and weak BLE Beacon (transmission power of −40 dBm, transmission radius of about 2 m).

Classifying the MAC addresses of non-weak BLE Beacon and weak BLE Beacon as MACS and MACW, respectively.

In the non-weak BLE Beacon, the MAC address of non-weak BLE Beacon in ordinary areas using the trilateration method is classified as MACSa; when three sided positioning is not available, and the MAC address of non-weak BLE Beacon in special areas using two-point positioning method is classified as MACSb; and weak BLE Beacon is applied in RSSI based proximity positioning method, and its MAC address is classified as MACW.

Specifically, the process of classifying the MAC addresses of the transmitting nodes is as follows:

Labeling MAC address of the transmitting node with a power of −40 dBm as MACW;

Labeling MAC address of the transmitting node with a power of −8 dBm and located in a special area as MACSb; and labeling MAC address of the transmitting node with a power of −8 dBm and located in an ordinary area as MACSa;

In this embodiment, the special area refer to a narrow and elongated area, which often appear in dense urban area, such as dense passages between two buildings, narrow sidewalks near tall buildings, and jungle paths covered by tall trees.

It is difficult to arrange a sufficient number of transmitting nodes in these special areas to achieve trilateration. In addition, due to the narrow and elongated path, the use of trilateration method may involve collinearity issues, resulting in serious deviation of trilateration results from actual results.

In this embodiment, other areas in the dense urban area except for special areas are defined as ordinary areas, labeling MAC address of the transmitting node with a power of −8 dBm and located in an ordinary area as MACSa.

Handheld mobile terminals can collect RSSI signals by walking along the path of the reference node (RTK fixed solution as the true value of the reference point). The reference nodes only collect data at these locations (to determine the true values and compare the positioning results).

Step 2, receiving MAC addresses of the transmitting nodes when the receiving node receives the RSSI from the transmitting nodes at the same time, and selecting one of the trilateration method, the two-point positioning method, or the proximity positioning method for MAC address category.

Using RSSI based proximity positioning method when the received MAC addresses belongs to the MACW.

Otherwise, sorting the RSSI values received from the transmitting nodes in descending order, if the MAC addresses corresponding to the first two RSSI values in the first three RSSI values belong to the MACSb, using the two-point positioning method; if the MAC addresses corresponding to the first three RSSI values received in descending order belong to the MACSa, at this point, the transmitting nodes form a triangle for trilateration.

Specifically, the specific calculation process for MAC address category is as follows:

when MAC⊆MACSa, $$\hat{X} = (A^T A)^{-1} A^T b;$$

when MAC⊆MACSb, $$[X, Y] = \left[ \frac{d'_1 x'_2 + d'_2 x'_1}{d'_1 + d'_2}, \frac{d'_1 y'_2 + d'_2 y'_1}{d'_1 + d'_2} \right];$$

when MAC⊆MACW, $[X,Y][x_{Beacon\_weak}, Y_{Beacon\_weak}]$.

In the formula, X and Y represent an estimated coordinate of the receiving point, and X represents a coordinate obtained by least squares estimation in the trilateration method.

$$A = \begin{bmatrix} 2(x_1 - x_3) & 2(y_1 - y_3) \\ 2(x_2 - x_3) & 2(y_2 - y_3) \end{bmatrix};$$

$$b = \begin{bmatrix} x_1^2 - x_3^2 + y_1^2 - y_3^2 + d_3^2 - d_1^2 \\ x_2^2 - x_3^2 + y_2^2 - y_3^2 + d_3^2 - d_2^2 \end{bmatrix};$$

Wherein, $(x_1, y_1)$, $(x_2, y_2)$, and $(x_3, y_3)$ are coordinates of the transmitting nodes corresponding to the first three RSSI values received in descending order in the trilateration method, and $d_1$, $d_2$ and $d_3$ are distances from an unknown node to the three transmitting nodes in the trilateration method, respectively.

$(x_1', y_1')$, $(x_2', y_2')$ are coordinates of the transmitting nodes corresponding to the first two RSSI values received in descending order, and $d_1'$ and $d_2'$ are distances from an unknown node to two transmitting nodes in the two-point positioning method respectively, which are converted from the distance measurement model.

$(x_{Beacon\_weak}, y_{Beacon\_weak})$ are coordinates of the transmitting nodes obtained based the proximity positioning method based on the RSSI.

Based on the received RSSI value and its corresponding MAC address, RSSI positioning is performed using the method that switches based on MAC address. During the time when GNSS obtains a positioning result, RSSI positioning obtains multiple positioning results.

The transmission frequency of the BLE Beacon used by the transmitting nodes in this embodiment is generally 10 Hz, and the minimum epoch interval for GNSS sampling is 1 s, which is 1 Hz. Usually, when the GNSS effective positioning result is output once, considering that in practical situations, BLE Beacon cannot achieve the optimal transmission frequency of 10 Hz, its RSSI effective positioning result can be output 5 to 7 times.

Defining a set of positioning results obtained from RSSI within a GNSS epoch as:

$$L_{RSSI} = \{(X_1, Y_1), (X_2, Y_2), \ldots, (X_h, Y_h)\}.$$

Wherein, h represents the number of effective positioning results of RSSI when the GNSS effective positioning result is output once; $(X_1, Y_1)$, $(X_2, Y_2)$, ..., $(X_h, Y_h)$ respectively represent a first, a second, ..., and a h-th positioning results of RSSI.

Obtaining an average weighted positioning coordinates $\overline{L}_{RSSI}$ of RSSI positioning, and the calculation formula is as follows:

$$\overline{L}_{RSSI} = \frac{1}{h}(X_1, Y_1) + \frac{1}{h}(X_2, Y_2) + \ldots + \frac{1}{h}(X_h, Y_h).$$

Step 3, collecting, by the receiving node, GNSS data, and using a differential positioning model (Differential Global Navigation Satellite System, DGNSS) to obtain GNSS positioning results. The GNSS positioning process is quite routine, so it will not be further elaborated for brevity.

Step 4, after independent positioning of GNSS and RSSI, performing weighted fusion on the positioning results of GNSS and RSSI.

Defining GNSS positioning coordinates obtained within a GNSS measurement epoch as $L_{GNSS}$.

Determining weights of the coordinates obtained by RSSI positioning and GNSS positioning, defining a variance obtained by GNSS independent positioning as $\sigma_{GNSS}^2$, and defining a variance obtained by RSSI independent positioning as $\sigma_{RSSI}^2$.

In the following example, $\sigma_{GNSS}^2=2.802$, $\sigma_{RSSI}^2=0.963$.

Let $$P_{GNSS} = \frac{1}{\sigma_{GNSS}^2}, P_{RSSI} = \frac{1}{\sigma_{RSSI}^2},$$

then the calculation formula for a final positioning result is as follows:

$$L_{final} = \begin{cases} \frac{L_{GNSS}P_{GNSS} + \overline{L}_{RSSI}P_{RSSI}}{P_{GNSS} + P_{RSSI}}, & MAC \subseteq MACS \\ (x_{Beacon\_weak}, y_{Beacon\_weak}), & MAC \subseteq MACQ \end{cases};$$

Wherein, $L_{Final}$ represents the positioning result of GNSS and RSSI integrated positioning method considering MAC address.

In addition, to verify the effectiveness of the method provided in the present disclosure, the following specific examples are also provided.

In the experimental field A, which is about 50 meters long and 2 meters wide, transmitting nodes are arranged every 5 meters along both sides of the path. According to the definition of collinearity and the conditions for BLE Beacon layout, roads with a width less than 2.42 meters are called special areas in dense urban areas.

The transmitting nodes adopt BLE Beacon with Bluetooth 5.0 technology, 10 transmitting nodes in total, as shown in FIG. 2. In addition, reference nodes are arranged every 2 meters on the path road, with two locations spaced 4 meters apart due to environmental reasons, 19 reference nodes in total. The coordinates of the reference nodes are set as the RTK fixed solution of the Hi-Target small intelligent four-star RTK measurement system A12, as the true coordinates.

The receiving node adopts a smartphone equipped with the Android 10.0 platform.

To ensure that the phase centers of the antennas of the smartphone and the Hi-Target receiver (which is used to calculate the true value of the reference node) are as close to the same vertical direction as possible, the smartphone is fixed on the centering rod of the receiver.

During the first RSSI positioning, the power of the Beacon was set to −8 dBm, the MAC address was labeled as MACSa, and the reference node position was calculated using trilateration as a comparative experiment for integrated positioning considering MAC address switching.

When the GNSS/RSSI integrated positioning considering MAC address switching for the second time, the transmission power of the first 5 Beacons on the path (in order from top to bottom and left to right) was set to −8 dBm, and the MAC address was labeled as MACSb. The transmission power of the last 5 Beacons on the path was set to −40 dBm, and the MAC address was labeled as MACW.

Compare the GNSS independent positioning, the RSSI independent positioning, and the improved integrated positioning results at the same observation epoch time with the RTK fixed solution positioning results as reference values, as shown in Table 1, and the positioning error was calculated.

TABLE 1

Comparison of GNSS independent positioning, RSSI independent positioning, and improved integrated positioning results at the same observation epoch time

| Error/m | GNSS independent positioning | RSSI independent positioning | Improved integrated positioning |
|---|---|---|---|
| Maximum value | 12.486 | 3.108 | 1.700 |
| average value | 4.706 | 1.565 | 0.822 |
| RMS | 2.802 | 0.870 | 0.430 |

Figure 3:
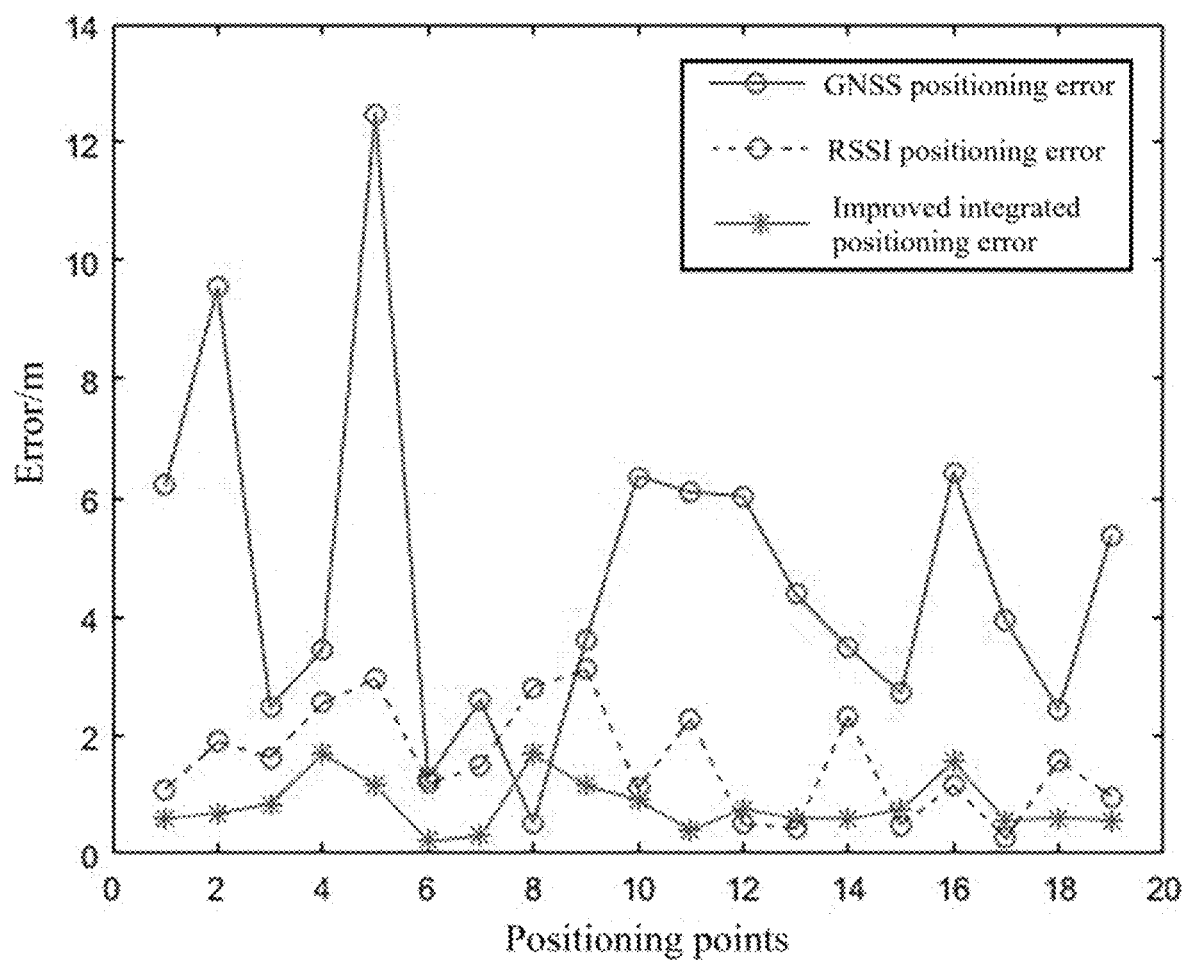
FIG. 3 shows the error comparison between the GNSS and RSSI integrated positioning method considering MAC address (hereinafter referred to as improved integrated positioning), the GNSS independent positioning, and RSSI independent positioning in an embodiment of the present disclosure.

As shown in FIG. 3, the error comparison between the GNSS and RSSI integrated positioning method (hereinafter referred to as the improved integrated positioning) considering MAC address of the present disclosure and the GNSS independent positioning and RSSI independent positioning is presented. From FIG. 3 and Table 1, it can be seen that the improved integrated positioning method proposed by the present disclosure has significantly reduced errors compared to traditional RSSI independent positioning and GNSS independent positioning methods.

Figure 4:
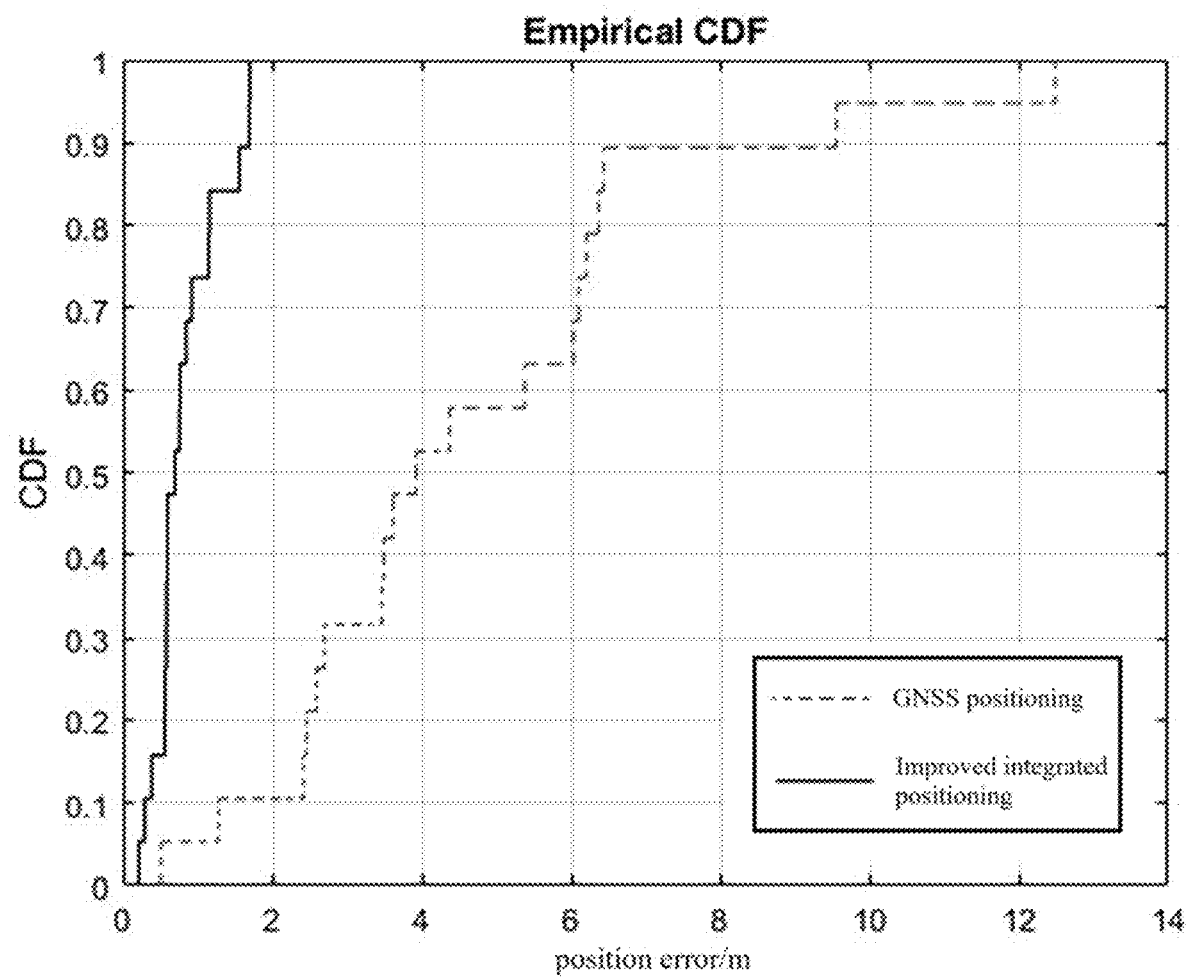
FIG. 4 shows the error cumulative distribution function of the improved integrated positioning and GNSS independent positioning in the embodiment of the present disclosure.
Figure 5:
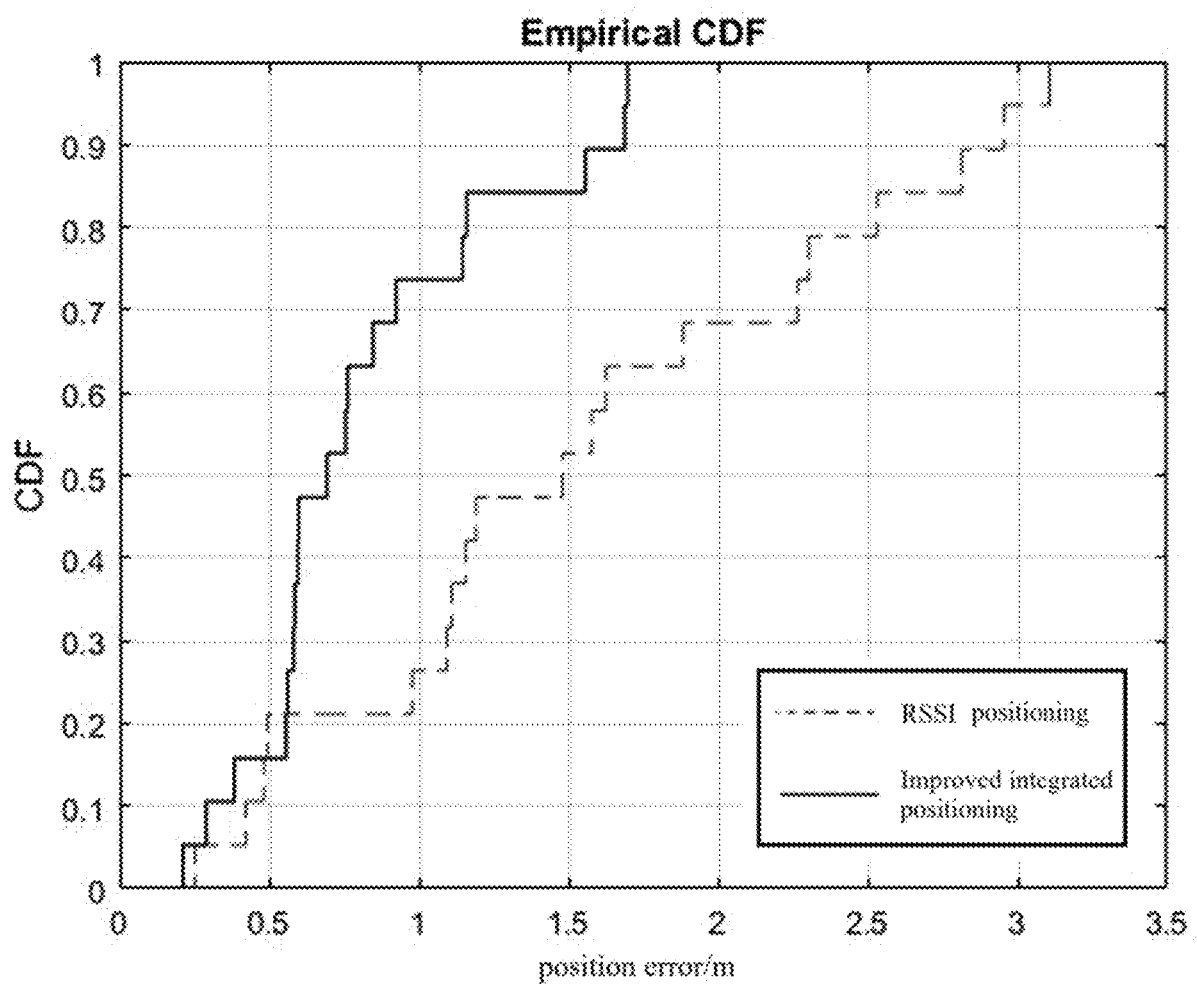
FIG. 5 shows the error cumulative distribution function of the improved integrated positioning and RSSI independent positioning in the embodiment of the present disclosure.
Figure 6:
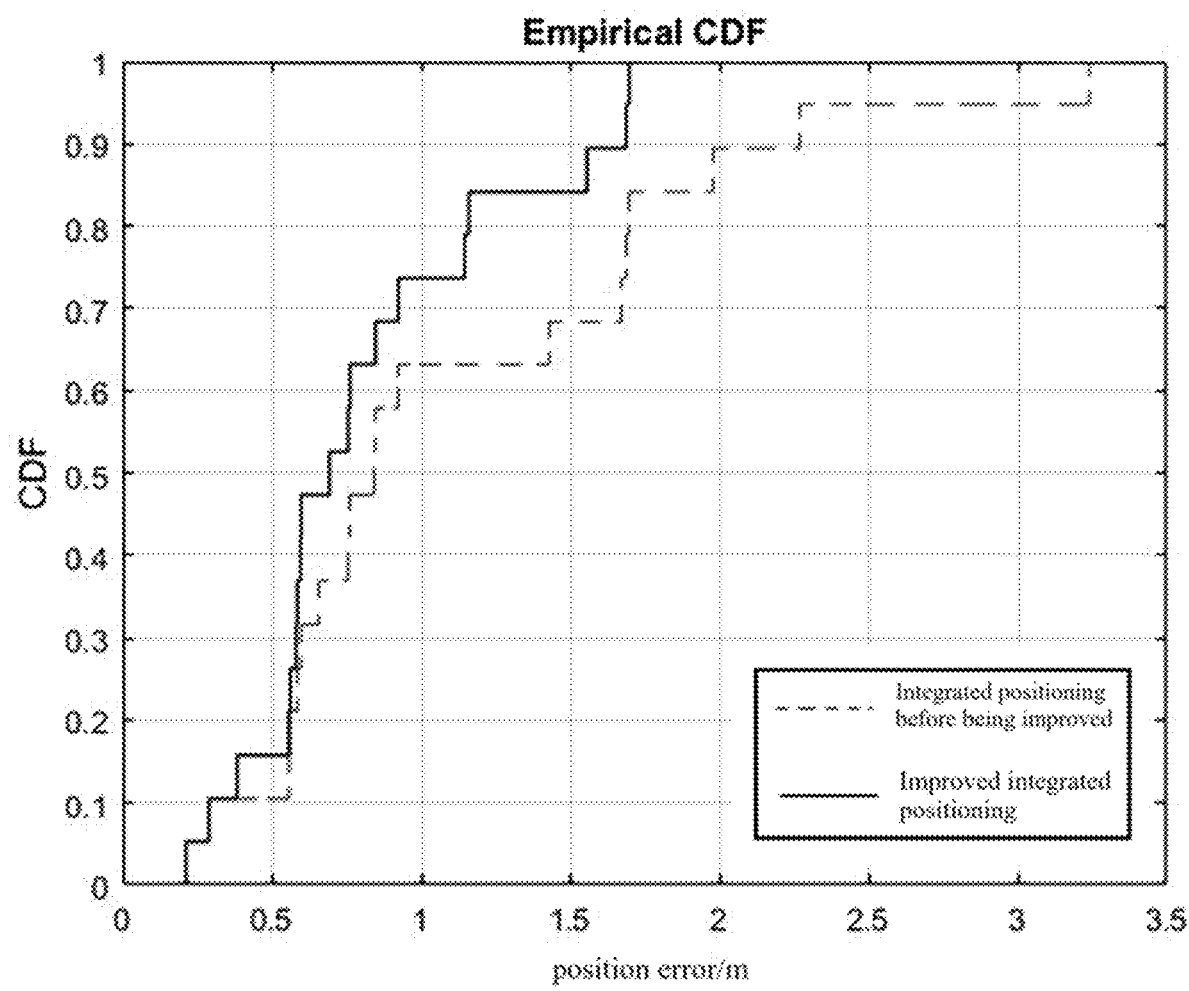
FIG. 6 shows the error cumulative distribution function of the improved integrated positioning and the integrated positioning before improvement in the embodiment of the present disclosure, wherein the integrated positioning before improvement refers to the integration of a single trilateration method and GNSS positioning method.

As shown in FIG. 4-FIG. 6, the comparative diagrams of the error cumulative distribution function (CDF) of the improved integrated positioning provided by the present disclosure, GNSS positioning, RSSI positioning with single method, and the integrated positioning before the improvement are presented. Wherein, Empirical CDF refers to the cumulative error distribution function, which is used to show the quality of the positioning results.

From FIG. 4-FIG. 6, it can be seen that the improved integrated positioning of the present disclosure has higher positioning accuracy compared to GNSS positioning, RSSI positioning with single method, and the integrated positioning before the improvement, which well meets the user's demand for high-precision positioning in dense urban areas.

Certainly, the above descriptions are merely preferred embodiments of the present disclosure. The present disclosure is not limited to the above embodiments listed. It should be noted that, all equivalent replacements and obvious variations made by any person skilled in the art under the teaching of the specification fall within the essential scope of the specification and shall be protected by the present disclosure.

What is claimed is:

1. A GNSS and RSSI integrated positioning method considering MAC address, comprising the following steps:

step 1, arranging transmitting nodes, classifying MAC addresses of the transmitting nodes, and using a receiving node to collect RSSI raw data, wherein the transmitting node is BLE Beacon, and the receiving node is a mobile terminal with BLE function;

a process of classifying the MAC addresses of the transmitting nodes is as follows:

labeling a MAC address of the transmitting node with a power of −40 dBm as MACW;

labeling a MAC address of the transmitting node with a power of −8 dBm and located in a special area as MACSb; labeling a MAC address of the transmitting node with a power of −8 dBm and located in an ordinary area as MACSa;

wherein the special area refers to a narrow and elongated area in dense urban area, while the ordinary area are relative to the special area, other area in dense urban area except for the special area is defined as the ordinary area;

step 2, receiving MAC addresses of the transmitting nodes when the receiving node receives the RSSI from the transmitting nodes at the same time, and selecting one of a trilateration method, a two-point positioning method, or a proximity positioning method for MAC address category;

using RSSI based proximity positioning method when the received MAC addresses belongs to the MACW;

otherwise, sorting the RSSI values received from the transmitting nodes in descending order and selecting the first three RSSI values received, if the MAC addresses corresponding to the first two RSSI values in the first three RSSI values belong to the MACSb, using the two-point positioning method; if the MAC addresses corresponding to the first three RSSI values in descending order belong to the MACSa, using the trilateration positioning method;

the specific calculation process for MAC address category is as follows:

when MAC⊆MACSa, $$\hat{X} = (A^T A)^{-1} A^T b;$$

when MAC⊆MACSb, $$[X, Y] = \left[ \frac{d'_1 x'_2 + d'_2 x'_1}{d'_1 + d'_2}, \frac{d'_1 y'_2 + d'_2 y'_1}{d'_1 + d'_2} \right];$$

when MAC⊆MACW, [X, Y]=[$x_{Beacon\_weak}$, $y_{Beacon\_weak}$];

in the formula, X and Y represent an estimated coordinate of the receiving point, and $\hat{X}$ represents a coordinate obtained by least squares estimation in the trilateration method;

$$A = \begin{bmatrix} 2(x_1 - x_3) & 2(y_1 - y_3) \\ 2(x_2 - x_3) & 2(y_2 - x_3) \end{bmatrix};$$

$$b = \begin{bmatrix} x_1^2 - x_3^2 + y_1^2 - y_3^2 + d_3^2 - d_1^2 \\ x_2^2 - x_3^2 + y_2^2 - y_3^2 + d_3^2 - d_2^2 \end{bmatrix};$$

wherein, $(x_1, y_1)$, $(x_2, y_2)$, and $(x_3, y_3)$ are coordinates of the transmitting nodes corresponding to the first three RSSI values received in descending order in the trilateration method, and $d_1$, $d_2$ and $d_3$ are distances from an unknown node to the three transmitting nodes in the trilateration method, respectively;

$(x_1', y_1')$, $(x_2', y_2')$ are coordinates of the transmitting nodes corresponding to the first two RSSI values received in descending order, and $d_1'$ and $d_2'$ are distances from an unknown node to two transmitting nodes in the two-point positioning method, respectively;

$(x_{Beacon\_weak}, y_{Beacon\_weak})$ are coordinates of the transmitting nodes obtained based the proximity positioning method of the RSSI;

step 3, collecting, by the receiving node, GNSS data, and using a differential positioning model to obtain GNSS positioning results;

step 4, after independent positioning of GNSS and RSSI, performing weighted fusion on the positioning results of GNSS and RSSI.

2. The GNSS and RSSI integrated positioning method considering MAC address according to claim 1, wherein in step 1, the transmitting nodes are arranged in a cross setting on both sides of a road, with a distance of 5-10 meters between adjacent transmitting nodes.

3. The GNSS and RSSI integrated positioning method considering MAC address according to claim 1, wherein in step 1, a method for determining the special area is as follows:

a maximum value of cosine value of interior angles of a triangle composed of three transmitting nodes in the trilateration method is defined as collinearity, with a range from 0.5 to 1.0, and an area with collinearity greater than 0.9 is defined as the special area.

4. The GNSS and RSSI integrated positioning method considering MAC address according to claim 1, wherein in step 2, defining a set of positioning results obtained from RSSI within a GNSS epoch as:

$L_{RSSI} = \{(X_1, Y_1), (X_2, Y_2), \ldots, (X_h, Y_h)\}$;

wherein, h represents the number of effective positioning results of RSSI when the GNSS effective positioning result is output once; $(X_1, Y_1), (X_2, Y_2), \ldots, (X_h, Y_h)$ respectively represent a first, a second, ..., and a h-th positioning results of RSSI;

obtaining an average weighted positioning coordinates $\overline{L}_{RSSI}$ of RSSI positioning, and a calculation formula is as follows:

$$\overline{L}_{RSSI} = \frac{1}{h}(X_1, Y_1) + \frac{1}{h}(X_2, Y_2) + \ldots + \frac{1}{h}(X_h, Y_h).$$

5. The GNSS and RSSI integrated positioning method considering MAC address according to claim 4, wherein the process of performing the weighted fusion of GNSS and RSSI positioning results in step 4 is as follows:

defining GNSS positioning coordinates obtained within a GNSS measurement epoch as $L_{GNSS}$;

determining weights of the coordinates obtained by RSSI positioning and GNSS positioning, defining a variance obtained by GNSS independent positioning as $\sigma_{GNSS}^2$, and a variance obtained by RSSI independent positioning as $\sigma_{RSSI}^2$;

let $$P_{GNSS} = \frac{1}{\sigma_{GNSS}^2}, P_{RSSI} = \frac{1}{\sigma_{RSSI}^2},$$

a calculation formula for a final positioning result is as follows:

$$L_{final} = \begin{cases} \frac{L_{GNSS}P_{GNSS} + \overline{L}_{RSSI}P_{RSSI}}{P_{GNSS} + P_{RSSI}}, & MAC \subseteq MACS \\ (x_{Beacon\_weak}, y_{Beacon\_weak}), & MAC \subseteq MACQ \end{cases};$$

wherein, $L_{Final}$ represents the positioning result of GNSS and RSSI integrated positioning method considering MAC address; MACW and MACS represent the MAC addresses of the transmitting nodes with power settings of −40 dBm and −8 dBm, respectively.

* * * * *